Oct. 15, 1929.  R. PORTE  1,732,063

LIQUID MEASURING APPARATUS

Filed March 8, 1928   5 Sheets-Sheet 1

Inventor
René Porte
By Sturtevant & Mason
Attorneys

Oct. 15, 1929.    R. PORTE    1,732,063
LIQUID MEASURING APPARATUS
Filed March 8, 1928    5 Sheets-Sheet 2

Oct. 15, 1929.  R. PORTE  1,732,063
LIQUID MEASURING APPARATUS
Filed March 8, 1928  5 Sheets-Sheet 3

Inventor
René Porte
Sturtevant & Mason
Attorneys

Oct. 15, 1929.   R. PORTE   1,732,063
LIQUID MEASURING APPARATUS
Filed March 8, 1928   5 Sheets-Sheet 4

Inventor
René Porte
By Sturtevant & Mason
Attorneys

Oct. 15, 1929.                R. PORTE                1,732,063
                     LIQUID MEASURING APPARATUS
                 Filed March 8, 1928      5 Sheets-Sheet 5

Patented Oct. 15, 1929

1,732,063

UNITED STATES PATENT OFFICE

RENÉ PORTE, OF LEVALLOIS-PERRET, FRANCE, ASSIGNOR TO SOCIETE HARDOLL ETAB-
LISSEMENTS HARIVEAU ET DOLIMIER ET RENÉ PORTE ET CIE. REUNIS, OF
LEVALLOIS-PERRET, FRANCE

LIQUID-MEASURING APPARATUS

Application filed March 8, 1928, Serial No. 260,204, and in Belgium March 15, 1927.

The present invention relates to liquid measuring apparatus and, more particularly, to those of the type provided with a pair of tanks arranged to alternately deliver measured quantities of liquid.

One of the objects of the invention is to provide means automatically operable to empty the tanks and to return the indicating dial to zero as soon as the delivery conduit is suspended on its hook.

Other objects will appear in the course of the detailed description now to be given with reference to the accompanying drawings, in which:—

Figure 9:
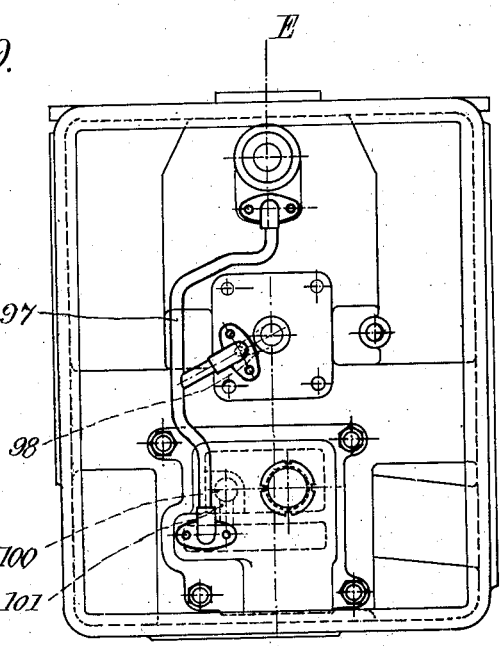
Fig. 9 shows in elevation a detail of the liquid control mechanism.
Figure 10:
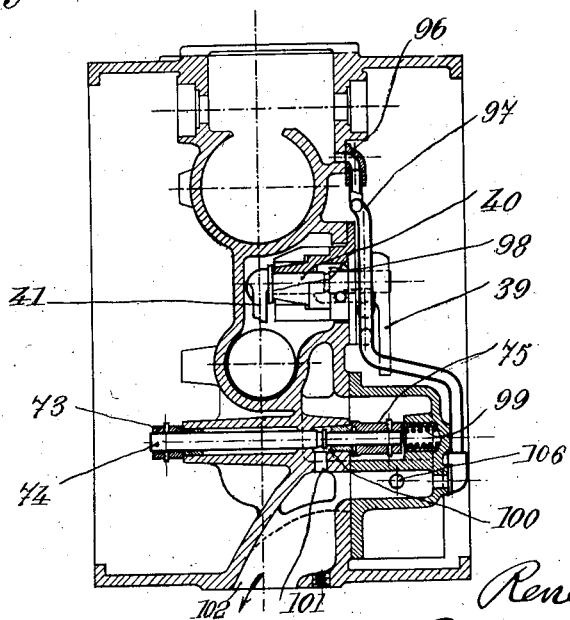

Fig. 10 a section taken on line E—F of Fig. 9.

Referring to the various figures of the drawings there is shown a frame 1, supporting a pump 2 which is connected through filter 3, to a feed and discharge reversing mechanism 5 adapted to supply liquid alternately to tanks 6 and 7. The device is fitted with a single door 4 provided with an orifice permitting a pump lever to be attached to or detached from pump 2. A column 8 supports a lamp globe 9, and an apron 10 extending over and protecting tanks 6 and 7. Tanks 6 and 7 are, conveniently, formed of glass cylinders 12 hermetically seated in annular grooves formed in bottom elements 11 and top-closures 13, the whole assembly being held together by tie-rods 14. Top-closures 13 are each provided with a float-chamber 15 containing a float-valve $15^1$,—a fusible plug 16,—and a compressed air-line $17^1$ for accelerating discharge of each tank. A conduit 17 is interposed between closures 13 to assure equalization of the pressures over each tank.

Figure 4:
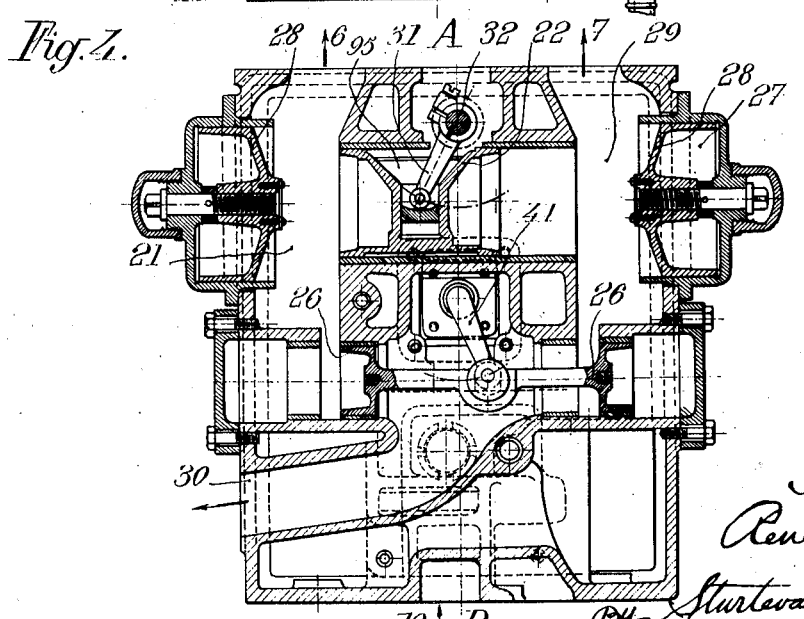
Fig. 4 illustrates, in section, the tank feed and discharge controls.
Figure 5:
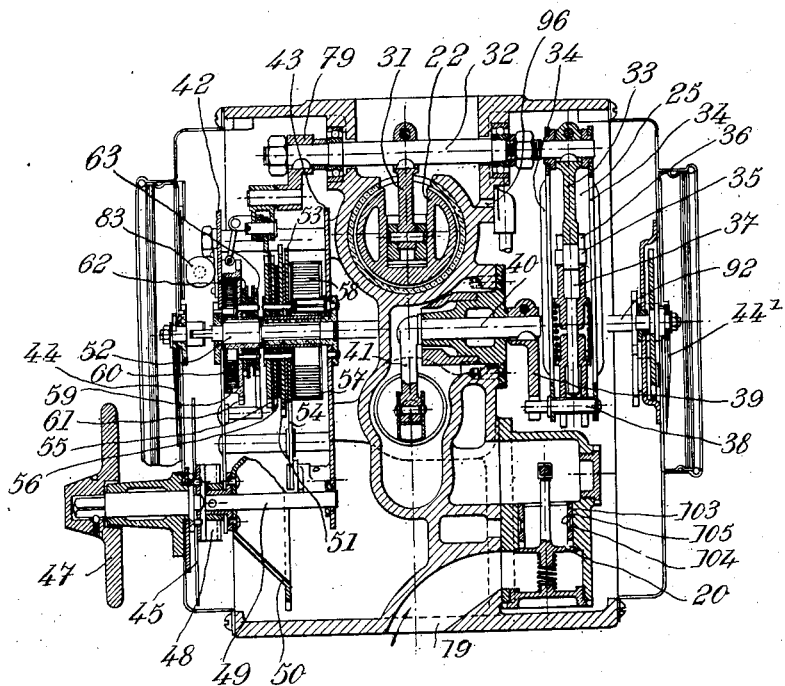
Fig. 5 is a section taken on line A—B of Fig. 4 and shows the indicating device on the right side of the figure and the reversing mechanism on the left.
Figure 6:
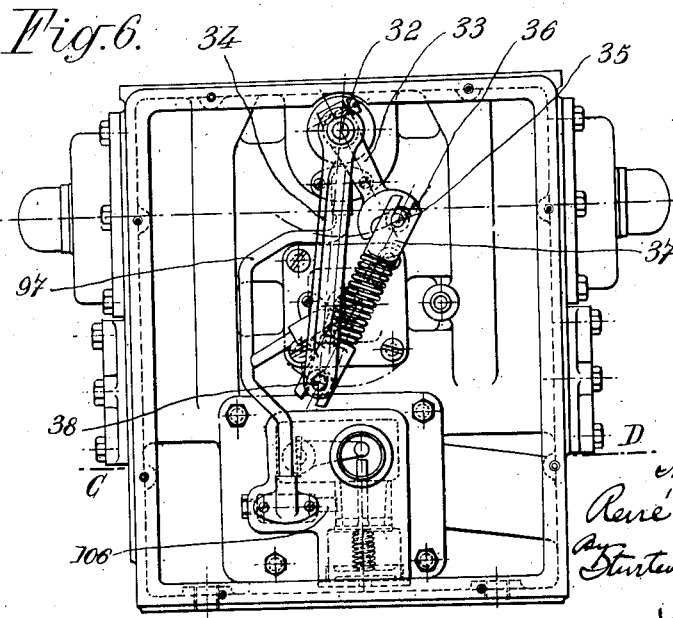
Fig. 6 is a side view (outer parts removed) representing the side of Fig. 5 containing the reversing mechanism.

The liquid discharged from pump 2 flows through orifice 19 into the reversing mechanism, moves past valve 20 (which, as will be shown later, is controlled by the indicator assembly), into chamber 21 (Fig. 5), then into one of the measuring tanks (tank 6 in the position of the operating elements illustrated in Fig. 4). When tank 6 is completely full, the liquid raises the corresponding float-valve $15^1$ into closed position, thus causing the liquid pressure inside the tank to increase and actuate piston diaphragm 22 from left to right. The latter is provided with a lever and spring system 25 (to be described later) serving to rapidly reverse the position of double piston-valve 26 when piston diaphragm 22 approaches its dead-point. As soon as reversal occurs tank 6 begins to discharge and tank 7 receives the liquid fed by pump 2. To correct inequalities in the capacity of the measuring tanks, each tank is provided with a correcting chamber 27 whose volume may be varied by adjusting the position of a piston 28 forming one wall thereof. The liquid being discharged from tank 7 during the filling of tank 6 passes into chamber 29, then through orifice 30 into the flexible delivery conduit. The reversing movement of piston diaphragm 22 is communicated by a lever 31 to a shaft 32 connected to lever and spring system 25 hereinabove mentioned. A lever 33 is keyed to one end of shaft 32 and the same extremity of the shaft carries a pair of links loosely mounted on opposite sides of lever 33. The free end of lever 33 is forked and coacts with a roller mounted on shaft 35 which is journalled in a block 36 forming one end of an extensible telescopic link 37 fitted with a compression spring. The other extremity of link 37 carries a shaft 38 which articulates with the lower extremities of links 34. Shaft 38 extends into a U-shaped recess formed at one end of a lever 39 keyed to a shaft 40 which actuates a second lever 41 connected to piston-valve 26. The lengths and position of the various levers and links are chosen in the manner described in applicant's co-pending application Serial No. 138,241, filed Sept. 28, 1926, i. e. so that piston-valve 26 is abruptly forced from one extreme position to the other slightly before piston-diaphragm 22 reaches its dead-point. It will be noted that compression spring reacts on shaft 32 only under the effect of the liquid pressure exerted on piston diaphragm 22 and in transmitting this pressure to lever 39.

Figure 1:
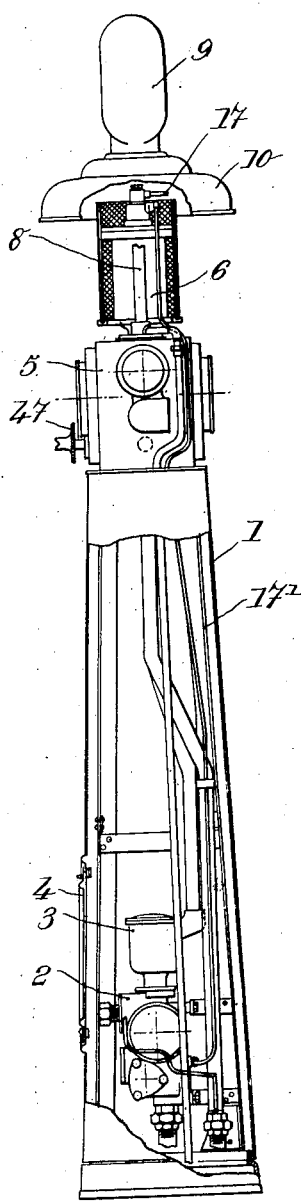
Fig. 1 is a side view (with parts of the exterior casing removed) of one illustrative embodiment of the invention.
Figure 2:
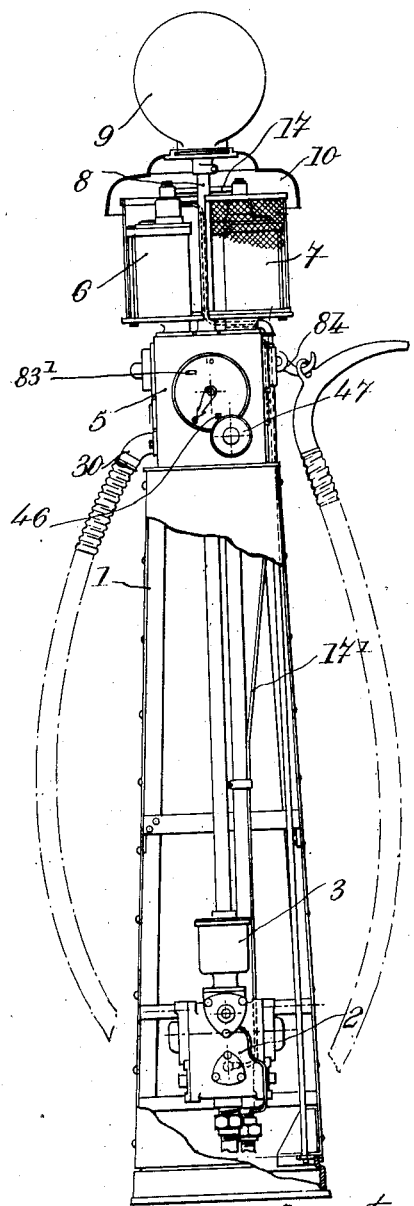
Fig. 2 shows the same device in front elevation.
Figure 3:
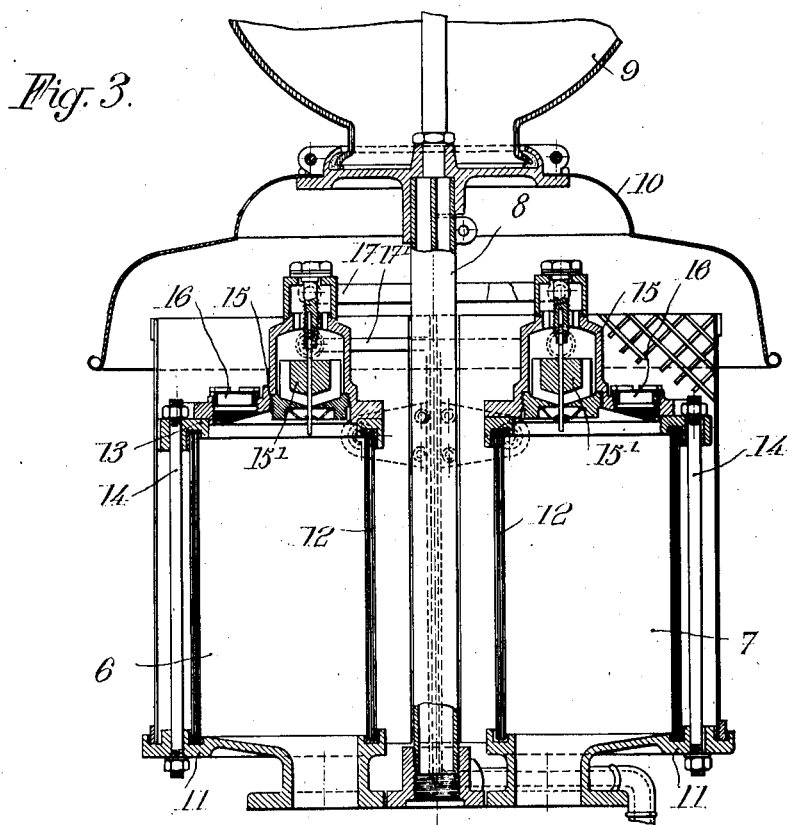
Fig. 3 represents an axial section of the tank assembly.
Figure 8:
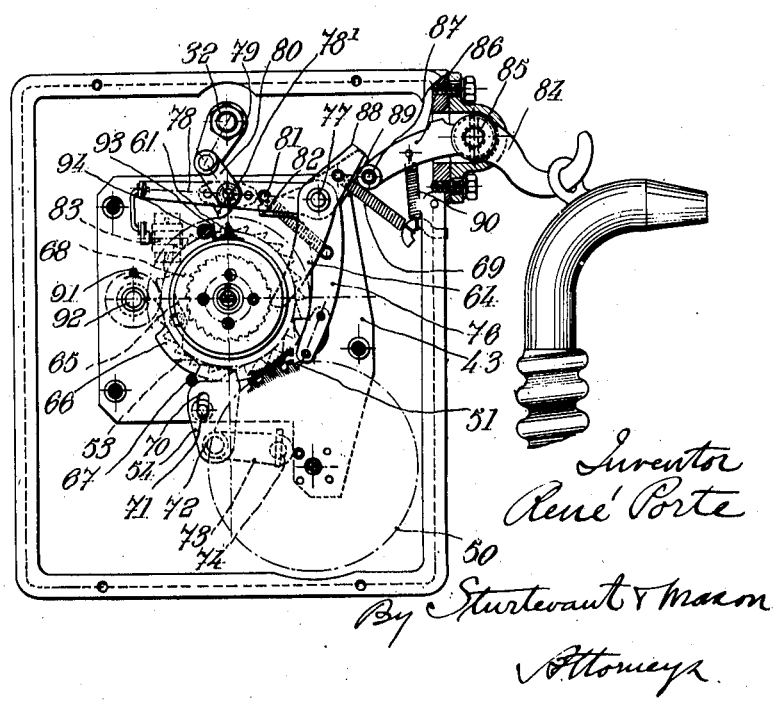
Fig. 8 is a side view (outer parts removed) of the indicator side of Fig. 5.

The recording and indicating assembly is mounted between casing elements 42, 43 and may be removed in a single block. It comprises three indicators, two dials 44 and $44^1$ rotatively mounted in front of fixed discs and a rotatable disc 45, called a "predetermining disc", carrying numbers which move past an opening 46 (Fig. 2). Disc 45 may be rotated to any position of adjustment by means of small hand wheel 47 which is coupled at 48 to a shaft 49 carrying a toothed wheel 50 meshing with a second toothed wheel 51 (Figs. 5 and 8) which forms part of a rotatable assembly mounted to rotate freely on shaft 52. This rotatable assembly comprises: a concentric disc 53 having a recess or cam surface formed in the periphery thereof functioning to displace a reciprocable element 54 to be described further on (Fig. 8);—a pair of ratchet-wheels 55 and 56 riveted to wheel 51 and to one another, wheel 56 having part of its periphery cut down to a smooth cylinder whose radius corresponds to the bottom of the teeth formed thereon;—and a casing 57 containing a spring fixed at one extremity by a holding element mounted on wall 43 and connected at its other extremity to casing 57. Shaft 52 is rigidly connected to a second assembly mounted thereon comprising: a casing 59 carrying a spiral spring 60, said casing being formed integral with a toothed wheel 61; and a pair of ratchet wheels 62 and 63 rigidly connected to casing 59, wheel 62 coacting with a spring actuated detent 64 while wheel 63 engages with a similar detent element 65 mounted on the rotatable assembly associated with spring 58. Element 65 is provided with a tail portion 66 positioned to slide over a fixed stop 67, whereby nose 68 moves out of engagement with wheel 63 (Fig. 8) when the device is not in operation while detent 64 is normally held in contact with ratchet 62 under the action of spring 69.

Figure 7:
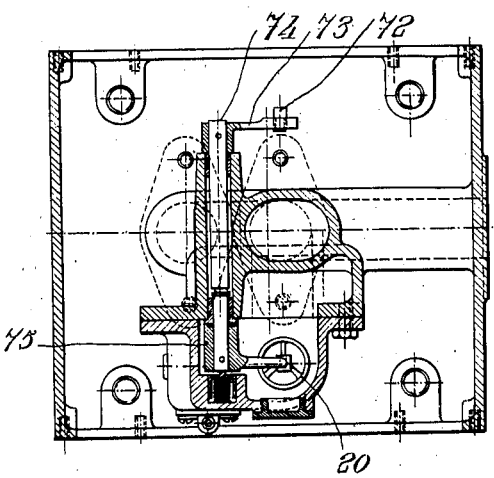
Fig. 7 is a section taken on line C—D of Fig. 6.

Reciprocable element 54 has an elongated orifice 70 formed therethrough which engages with a guide-pin 71 and articulates at 72 with a lever 73 keyed to a shaft which actuates valve 20 through the intermediary of a lever 75 (Fig. 7). Valve 20 tends to move into open position when reciprocable element 54 is moved outwardly by guiding surface 53.

Ratchets 55 and 56 constitute a so-called "anchor" escapement in which one detent is mounted on the end of a lever 76 pivotally mounted at 77 while the other detent is associated with a second lever 78 likewise pivoted at 77. Lever 78 is oscillated by shaft 32 through the intermediary of a lever 79 and a link 80 with each displacement of piston diaphragm 22 (Fig. 4) and carries a stop 81 which contacts with the tail portion of lever 76 each time that lever 78 executes a downward movement. The free end of lever 78 controls a totalizer 83 showing totals which may be read through opening $83^1$ formed in the main recording disc (Fig. 2).

A hook 84, constituting the only means of suspension for the free end of the flexible delivery conduit (not shown) forms one arm of a lever, pivoted at 85, whose other arm 86 carries a pin 87 capable of bearing against the tail-portions 88 and 89 of levers 64 and 76 respectively. Arm 86 is connected to spring 90 which raises arm 84 as soon as the delivery conduit is unhooked.

Toothed wheel 61 meshes with a pinion 91 keyed to a shaft 92 (Figs. 5 and 8) which is designed to actuate indicator $44^1$ through the intermediary of an appropriate train of gears.

The hereinabove described assembly operates in the following manner: Assuming that it is desired to deliver a predetermined quantity of liquid, hand wheel 47 is rotated clockwise so as to move disc 45 to the position where the desired quantity of liquid is indicated in opening 46. Simultaneously valve 20 moves out of its seat and permits a filling operation to take place. The rotation of wheel 47 causes toothed wheel 50 to rotate wheel 51 and casing 57 which is rigidly connected to the latter in a counter clockwise direction thus winding up spring 58. Detent 65, articulated laterally on assembly 55, 56, 57, turns with the latter until tail portion 66, which has been in contact with stop 67, moves away from the latter so that nose 68 of said detent, under the action of a spring (not shown), slides over the teeth of ratchet 63. In the same operation, the teeth of ratchet 56 come into contact with the free end of lever 76 and assembly 55, 56, 57 is held against the action of spring 58 in the position determined by the arrest of hand wheel 47. As soon as pump 2 is actuated, liquid will flow into the apparatus and fill one of the measuring tanks in the manner already described. When reversal of piston diaphragm 22 takes place, shaft 32 will rotate and oscillate lever 79 and link 80 thus lowering lever 78 so that nose $78^1$ moves into position between two teeth of ratchet 55. Nose $78^1$ should move downward before the free end of lever 76 releases the tooth with which it had been in engagement, it being noted that stop 81 exercises pressure on tail portion 82 of lever 76 so as to move the later out of engagement with 55 and thus permits assembly 55, 56, 57 to rotate half the distance between a pair of teeth. By the time that piston diaphragm reaches the end of its reversing course, nose 78¹ will have moved out of engagement with ratchet 55, while the nose of lever 76 will have engaged in the tooth next following so that assembly 55, 56, 57 will have turned again (clockwise) through an angle corresponding to half the distance between a pair of teeth. During the rotation of 55, 56, 57, detent 65 will have been displaced in the same direction, and since nose 68 of the latter is engaged with ratchet 63, the "unwinding" of 55, 56, 57 over a distance of one tooth will result in a corresponding rotation of assembly 60, 62, 63 thus producing a difference in the indications of the "predetermining" disc and the main dials. Hands 44 and 44¹ will therefore have been advanced one unit over their dials and spring 60 will have had its tension slightly increased. During the "unwinding" movement of 55, 56, 57, disc 45 will move backward and show a number differing by one unit (less) than the one formerly visible through orifice 46. The foregoing operation repeats itself with each reversal of piston diaphragm 22 until disc 45 indicates zero and hands 44 and 44¹ have advanced by an amount corresponding to the total loss indicated by disc 45. At this point, tail portion 66 of detent 65 will have again moved onto stop 67 and the nose of said detent will be out of engagement with ratchet 63. Assembly 60, 62, 63 and, therefore, hands 44 and 44¹, will be maintained in position by the opposed action of spring 60 and the engagement of detent 64 with the teeth of ratchet 62, thus permitting the buyer to note how much liquid has been delivered.

If, at the end of the foregoing operation, the buyer should decide to take an additional quantity of liquid, hand-wheel 47 is turned to the desired amount and pump 2 actuated until disc 45 again indicates zero. Hands 44 and 44¹ will add the second purchase to the first and indicate the amount taken in both operations. To bring 44 and 44¹ back to zero, it suffices only to lower hook 84 by hanging the flexible delivery conduit thereon or otherwise. Downward movement of arm 84 causes arm 86 to move upwardly thus actuating tail-portions 88 and 89 of levers 64 and 76 respectively. Detent 64 will thereupon release ratchet 62 thus permitting spring 60 to unwind and bring 44 and 44¹ back to zero. Movement of 44 and 44¹ past the zero mark is prevented by the contact of a finger 91 with a stop 93. The pressure of pin 87 on tail-portion 89 of lever 76 simultaneously releases wheel 56 which, under the action of spring 58, brings disc 45 back to zero (this last applies to the case where the predetermined amount of liquid has not been entirely delivered), and rotates 53 back to the position where the recessed portion of its surface is opposite reciprocable element 54. Valve 20 then closes and stops the further feed of liquid to the measuring tanks. The arrest of assembly 55, 56, 57 is assured by the contact of one side of the recess formed in wheel 51 with element 54.

It is to be noted that in the present device, stuffing-boxes, because of their unreliability, have been eliminated. In order to avoid liquid losses, a draining system (Figs. 9 and 10) has been provided which returns any escaping liquid to the main fuel supply reservoir. Thus liquid finding its way into space 95 (Fig. 4) is returned via conduits 96 and 97 (Fig. 10).

Shaft 74 controlling valve 20 is mounted so that a shoulder formed thereon is held firmly in contact with a surface through which the shaft passes by a spring 99. In the event of leakage at the joint, the escaping liquid will accumulate in a small chamber 100 whence it will be returned to the main reservoir by conduits 101 and 102. The same anti-leakage system is employed in connection with pump 2, wherein stuffing boxes of the usual type are employed to prevent entry of air and drainage chambers and conduits to prevent loss of liquid.

In order to empty a partially filled tank when the apparatus is not in operation and valve 20 is in closed position, the latter is provided (Fig. 5) with a sleeve 103 pierced at 105 and having annular recesses 104 formed therein which face drainage ports 106 (Fig. 10) when valve 20 is in closed position. Ports 106 communicate with drainage conduit 102.

What I claim is:—

1. In an apparatus of the class described, the combination of a liquid measuring assembly a pump connected to said liquid measuring assembly, a delivery conduit, suspending means for said delivery conduit, and means operable by the suspension of said delivery conduit on said suspending means to block communication between said pump and said liquid measuring assembly.

2. In an apparatus of the class described, the combination of a liquid measuring assembly, liquid indicating means adapted to indicate the quantity of liquid delivered by said liquid measuring means, a delivery conduit, suspending means for said delivery conduit, and means operable by the suspension of the delivery conduit on its suspending means to alter the indication of said liquid indicating means.

3. In an apparatus of the class described, the combination of a liquid measuring assembly, a first indicating means controlling the amount of liquid to be delivered, by said assembly, a second indicating means showing the amount of liquid already delivered, a delivery conduit, suspending means for said delivery conduit, and means operable by the suspension of said delivery conduit on its suspending means to alter the indications of said first and second indicating means.

4. In an apparatus of the class described, a liquid measuring assembly, a pump connected to said liquid measuring assembly, indicating means associated with said measuring assembly, a delivery conduit, suspending means for said delivery conduit, and means operable by the suspension of said conduit on its suspending means (1) to block communication between the pump and the liquid measuring assembly and (2) to alter the indication of said indicating means.

5. In an apparatus of the class described, the combination of a pair of liquid measuring tanks, means for alternately filling and discharging each tank, and a correcting chamber associated with one of said tanks, said correcting chamber having means associated therewith for varying the volume thereof.

6. In an apparatus of the class described a pair of measuring tanks, reciprocable means operable to control the alternate filling and discharge of each tank, a pump adapted to supply liquid to said tanks, a valve controlling communication between said pump and said tanks, a first indicating means controlling the amount of liquid to be delivered by said tanks, means operable by said indicating means to open and close said valve, a second indicating means adapted to show the total amount of liquid delivered by the measuring tanks, means operable by the movement of said reciprocable means to simultaneously decrease the reading of said first indicating means and increase the reading of said second indicating means, a delivery conduit, suspending means for said delivery conduit, and means operable by the suspension of said delivery conduit on its suspending means to close said valve and to alter the reading of said second indicating means.

7. In an apparatus of the class described a pair of measuring tanks, a pump, a valve controlling communication between the pump and the measuring tanks, said valve having a skirt portion formed thereon with an orifice therethrough, said skirt portion being positioned on the tank side of said valve, a wall enclosing said skirt portion of the valve and having a port formed therein at a level coinciding with that of the orifice of said skirt when the valve is in closed position, and a conduit connected to said port.

In testimony whereof I have hereunto set my hand.

RENÉ PORTE.